US 6,747,070 B2

(12) United States Patent
Wenning et al.

(10) Patent No.: US 6,747,070 B2
(45) Date of Patent: Jun. 8, 2004

(54) UV CURABLE POWDER COATING COMPOSITIONS

(75) Inventors: Andreas Wenning, Nottuln (DE); Giselher Franzmann, Witten (DE); Emmanouil Spyrou, Marl (DE)

(73) Assignee: Degussa AG, Duesseldorf (DE)

( * ) Notice: Subject to any disclaimer, the term of this patent is extended or adjusted under 35 U.S.C. 154(b) by 147 days.

(21) Appl. No.: 09/991,643

(22) Filed: Nov. 26, 2001

(65) Prior Publication Data

US 2002/0099127 A1 Jul. 25, 2002

(30) Foreign Application Priority Data

Nov. 25, 2000 (DE) .......................................... 100 58 617

(51) Int. Cl.⁷ .......................... C09D 5/03; C09D 167/00; C09D 175/14; C08J 7/18
(52) U.S. Cl. ............................. 522/90; 522/93; 522/96; 522/111; 522/173; 522/97; 525/437; 525/445; 525/453; 525/455; 427/496; 427/500; 427/508; 427/514; 427/195; 526/301; 526/302
(58) Field of Search .............................. 522/93, 90, 96, 522/97, 111, 173; 528/65; 526/301, 302; 525/437, 453, 445, 455; 427/496, 500, 508, 514, 195

(56) References Cited

U.S. PATENT DOCUMENTS

| 4,552,932 | A | | 11/1985 | Schollenberger |
| 4,895,895 | A | * | 1/1990 | Osborne et al. ............... 525/28 |
| 4,973,646 | A | * | 11/1990 | Witzeman et al. ............ 528/45 |
| 5,075,393 | A | * | 12/1991 | Thompson ................... 525/444 |
| 5,373,084 | A | * | 12/1994 | Chang ......................... 528/272 |
| 5,620,751 | A | * | 4/1997 | Brindoepke et al. ......... 427/506 |
| 5,639,560 | A | | 6/1997 | Moens et al. |
| 5,922,473 | A | * | 7/1999 | Muthiah et al. ............. 428/481 |
| 6,136,882 | A | * | 10/2000 | Daly et al. ................... 522/107 |
| 6,184,311 | B1 | * | 2/2001 | O'Keeffe et al. ............ 525/438 |
| 6,555,597 | B1 | * | 4/2003 | Weikard et al. ............. 522/174 |

FOREIGN PATENT DOCUMENTS

EP 0 924 234 6/1999

* cited by examiner

Primary Examiner—Susan W. Berman
(74) Attorney, Agent, or Firm—Oblon, Spivak, McClelland, Maier & Neustadt, P.C.

(57) ABSTRACT

A UV curable powder coating composition having a binder containing A) 60–90% by weight of at least one amorphous urethane acrylate and B) 10–40% by weight of at least one crystalline urethane acrylate; and having an auxiliary, crosslinks to form a light- and weather-stable paint film that possesses excellent gloss.

17 Claims, No Drawings

UV CURABLE POWDER COATING COMPOSITIONS

BACKGROUND OF THE INVENTION

1. Field of the Invention

This invention relates to a UV curable powder coating composition that crosslinks to form a light-stable and weather-stable paint film possessing excellent gloss.

2. Discussion of the Background

Thermally crosslinkable powder coatings are known and are frequently used in the paint industry.

For instance, DE-C-27 35 497 describes PUR powder coatings possessing excellent weathering and heat stability. The crosslinkers, the preparation of which is described in DE-C-27 12 931, consist of ε-caprolactam blocked isophorone diisocyanate containing isocyanurate groups. Also known are polyisocyanates containing urethane, biuret or urea groups having blocked isocyanate groups.

The disadvantage of these systems is the detachment of the blocking agent during the thermal crosslinking reaction. Since the blocking agent may thus be emitted into the environment, special precautions have to be taken for ecological and occupational hygiene reasons to clean the exit air and/or recover the blocking agent. In addition, the reactivity of the crosslinkers is low. Curing temperatures above 170° C. are required.

Both disadvantages, emission of blocking agent and curing at high temperatures, can be circumvented by powder coatings which are cured by radiation, known as UV powder coatings. Such UV powder coatings are known and described for example in U.S. Pat. No. 3,485,732, EP-A-0 407 826 and U.S. Pat. No. 5,639,560.

U.S. Pat. No. 5,639,560 describes UV curable powder compositions with specific crystalline polyesters which also have methacryloyl end groups, as binders. These powder compositions optionally contain ethylenically unsaturated oligomers, including urethane acrylates. The amount of ethylenically unsaturated oligomer is minor, preferably up to 10 percent by weight. But the UV powder coating formulations disclosed in this patent have significant disadvantages. They are only grindable at minus 80° C. and generally the resulting coatings are either not stable to outdoor weather or are not flexible. A particularly serious disadvantage is a very low König pendulum hardness of below 120 s.

SUMMARY OF THE INVENTION

It is an object of the present invention to provide a UV powder coating composition which is storage stable at 35° C. After curing of the paint films, the composition is required to lead to coatings which are hard, flexible, and stable to outdoor weather. Moreover, the powder coatings should be grindable using little, if any, cryogen.

This and other objects have been achieved by the present invention, the first embodiment of which includes a UV curable powder coating composition, comprising:

I. a binder comprising
   A) 60–90% by weight of at least one amorphous urethane acrylate; and
   B) 10–40% by weight of at least one crystalline urethane acrylate;
      provided that a Tg of a mixture of A and B is at least 35° C.; and
II. an auxiliary.

In another embodiment the present invention relates to a polymer containing a urethane group and a terminal acrylate group, comprising:

A) 60–90% by weight of at least one amorphous urethane acrylate; and
B) 10–40% by weight of at least one crystalline urethane acrylate;
   provided that a Tg of a mixture of A and B is at least 35° C.; and
   wherein said amorphous urethane acrylate A is formed by reaction of the following components:
   A1) at least one amorphous hydroxyl-containing polyester having a Tg of 35 to 80° C.;
   A2) at least one polyisocyanate;
   A3) at least one compound having at least one alcohol group and at least one polymerizable acrylate group; and
   wherein said crystalline urethane acrylate B is formed by reaction of the following components;
   B1) at least one crystalline hydroxyl-containing polyester;
   B2) at least one polyisocyanate; and
   B3) at least one compound having at least one alcohol group and at least one polymerizable acrylate group.

Yet another embodiment of the present invention relates to a coating, obtained from the above powder coating composition; wherein said coating is opaque or transparent.

The present invention also relates to a method of producing a coating, comprising:
   coating a substrate with the powder coating composition according to claim 1.

DETAILED DESCRIPTION OF THE INVENTION

The object of the present invention is surprisingly achieved by a radiation curable powder coating composition which includes a binder comprising a mixture of at least one amorphous urethane acrylate and at least one crystalline urethane acrylate, said mixture having a glass transition point (Tg) of at least 35° C., preferably at least 45° C. and most preferably at least 55° C.

The invention provides a UV curable powder coating composition comprising
I. a binder comprising
   A) 60–90% by weight of at least one amorphous urethane acrylate, and
   B) 10–40% by weight of at least one crystalline urethane acrylate,
      subject to the proviso that the Tg of the mixture of A and B is at least 35° C.; and
II. an auxiliary and/or an additive material.

The amount of component A includes all values and subvalues therebetween, especially including 65, 70, 75, 80 and 85% by weight. The amount of component B includes all values and subvalues therebetween, especially including 15, 20, 25, 30 and 35% by weight.

The urethane acrylate for the purpose of this invention consist of a hydroxyl-containing polyester to which a urethane group and an acrylate group are attached by reaction with a polyisocyanate and an acrylate-containing alcohol.

The amorphous urethane acrylate of the invention is prepared from an amorphous hydroxyl-containing polyester (A1) having a Tg of 35–80° C. by reaction with a polyisocyanate (A2) and a compound which contains both at least one alcohol group and at least one polymerizable acrylate group (A3). The amorphous urethane acrylate possesses a urethane group and a terminal acrylate group.

A1. An amorphous hydroxyl-containing polyester having a Tg of 35–80° C. is prepared by polycondensation of a dicarboxylic acid and a diol. The Tg of polyester (A1) includes all values and subvalues therebetween, especially including 40, 45, 50, 55, 60, 65, 70 and 75° C. The condensation is effected in an inert gas atmosphere at temperatures of 100 to 260° C., preferably 130 to 220° C., in the melt or azeotropically, as described, for example, in Methoden der Organischen Chemie (Houben-Weyl); vol. 14/2, pages 1 to 5, 21 to 23, 40 to 44, Georg Thieme Verlag, Stuttgart, 1963, or in C. R. Martens, Alkyd Resins, pages 51 to 59, Reinhold Plastics Appl. Series, Reinhold Publishing Comp., New York, 1961.

Preferred carboxylic acids for preparing polyesters can be aliphatic, cycloaliphatic, aromatic and/or heterocyclic in nature and can be optionally halogen substituted and/or unsaturated. Preferred examples are succinic acid, adipic acid, suberic acid, azelaic acid, sebacic acid, phthalic acid, terephthalic acid, isophthalic acid, trimellitic acid, pyromellitic acid, tetrahydrophthalic acid, hexahydrophthalic acid, hexahydroterephthalic acid, dichlorophthalic acid, tetrachlorophthalic acid, endomethylenetetrahydrophthalic acid, glutaric acid and, if available, their anhydrides, dimethyl terephthalate, bisglycol terephthalate. Isophthalic acid is particularly preferred.

Useful polyols include, for example, monoethylene glycol, 1,2- and 1,3-propylene glycol, 1,4- and 2,3-butylene glycol, di-β-hydroxyethylbutanediol, 1,5-pentanediol, 1,6-hexanediol, 1,8-octanediol, decanediol, dodecanediol, neopentylglycol, cyclohexanediol, 3(4),8(9)-bis(hydroxymethyl)tricyclo[5.2.1.0$^{2,6}$]decane (dicidol), bis(1,4-hydroxymethyl)cyclohexane, 2,2-bis(4-hydroxycyclohexyl)propane, 2,2-bis[4-(β-hydroxyethoxy)phenyl]propane, 2-methyl-1,3-propanediol, 2-methyl-1,5-pentanediol, 2,2,4(2,4,4)-trimethyl-1,6-hexanediol, glycerol, trimethylolpropane, trimethylolethane, 1,2,6-hexanetiol, 1,2,4-butanetriol, tris([β-hydroxy-ethyl)isocyanurate, pentaerythritol, mannitol and sorbitol and also diethylene glycol, triethylene glycol, tetraethylene glycol, dipropylene glycol, polypropylene glycols, polybutylene glycols, xylylene glycol and neopentylglycol hydroxypivalate. Preference is given to monoethylene glycol, neopentylglycol, dicidol, cyclohexanedimethanol, trimethylolpropane and glycerol.

The thus prepared amorphous polyester has an OH number of 15–100 mg of KOH/g, a Tg of 35–80° C. and an acid number of <5. The OH number of the amorphous polyester includes all values and subvalues therebetween, especially including 20, 30, 40, 50, 60, 70, 80 and 90 mg of KOH/g. The acid number of the amorphous polyester is preferably <4, and most preferably <3. It is also possible to use a mixture of amorphous polyesters. Certain starting materials which are known to be deleterious to outdoor weather stability (terephthalic acid for example) should not be used at all or only in small amounts.

A2. The amorphous urethane acrylate of the present invention is prepared using a polyisocyanate that is a diisocyanate of aliphatic, (cyclo)aliphatic or cycloaliphatic structure. Preferred examples of the polyisocyanates are 2-methylpentamethylene 1,5-diisocyanate, hexamethylene diisocyanate, trimethylhexamethylene 1,6-diisocyanate, especially the 2,2,4-and the 2,4,4-isomers and technical grade mixtures of the two isomers, 4,4'-methylenebis(cyclohexyl isocyanate), norbornane diisocyanate and 3,3,5-trimethyl-1-isocyanato-3-isocyanatomethylcyclohexane (IPDI). It is equally possible to use a polyisocyanate obtained by reaction of a polyisocyanate with itself via isocyanate groups, such as isocyanurate which is formed by reaction of three isocyanate groups. The polyisocyanates may likewise contain a biuret or an allophanate group. IPDI is particularly preferred.

A3. Preferred polymerizable compounds having at least one free OH group and one or more polymerizable acrylate groups include, for example, hydroxyethyl acrylate (HEA), hydroxypropyl acrylate and glyceryl diacrylate. Hydroxyethyl acrylate (HEA) is particularly preferred.

The amorphous urethane acrylate A is prepared from the amorphous OH-containing polyesters (A1), polyisocyanates (A2) and (A3) by first initially charging the polyisocyanate, adding DBTL catalyst (dibutyltin dilaurate) and IONOL CP (Shell) polymerization inhibitor and the polyester in an NCO:OH ratio of 2.5–1.5:1. The NCO:OH ratio includes all values and subvalues therebetween, especially including 2.3:1, 2.1:1, 1.9:1 and 1.7:1. After the addition has ended, the reaction is completed at 100–140° C. The temperature includes all values and subvalues therebetween, especially including 105, 110, 115, 120, 125, 130 and 135° C. The reaction product is then admixed with the A3 component, for example hydroxyethyl acrylate, in a residual NCO:OH ratio of 1.0–1.1:1 and the reaction is completed at 80–140° C., so that a NCO content below 0.1%, preferably below 0.05, more preferably below 0.01 and most preferably below 0.005% is obtained. The temperature for the completion of the reaction includes all values and subvalues therebetween, especially including 90, 100, 110, 120 and 130° C. Another possibility is a preliminary reaction of a polyisocyanate, for example IPDI, with the A3 component and the addition of this NCO-containing preliminary product to the hydroxyl-containing polyester.

B. The crystalline urethane acrylate of the invention is prepared by reacting crystalline hydroxyl-containing a polyester (B1) with a polyisocyanate (B2) and a component A3. A particularly preferred component A3 is hydroxyethyl acrylate (HEA). The crystalline urethane acrylate possesses both urethane groups and terminal acrylate groups.

B1. A crystalline hydroxyl-containing polyester is prepared by polycondensation as described for amorphous polyesters under A1. An acid component consisting of 80–100 mol percent of a saturated linear aliphatic or cycloaliphatic dicarboxylic acid having 4–14 carbon atoms and 0–20 mol percent of another aliphatic or cycloaliphatic or aromatic di- or polycarboxylic acid is reacted with an alcohol component consisting of 80–100 mol percent of a linear aliphatic diol having 2–15 carbon atoms and 0–20% of another aliphatic or cycloaliphatic di- or polyol having 2–15 carbon atoms. The thus prepared crystalline hydroxyl-containing polyester has an OH number of 15–80 mg of KOH/g, an acid number of <5 mg of KOH/g and a melting point of 40–130° C. The OH number includes all values and subvalues therebetween, especially including 25, 35, 45, 55, 65, and 75 mg of KOH/g. The acid number is preferably <4, more preferably <3 and most preferably <2. The melting point includes all values and subvalues therebetween, especially including 50, 60, 70, 80, 90, 100, and 120° C.

Preferred carboxylic acids for preparing crystalline polyesters are succinic acid, adipic acid, suberic acid, azelaic acid, sebacic acid, dodecanedioic acid, tetrahydrophthalic acid, hexahydrophthalic acid, hexahydroterephthalic acid, endomethylenetetrahydrophthalic acid, glutaric acid and, if available, their anhydrides. Dodecanedioic acid is particularly preferred.

Preferred polyols are: ethylene glycol, 1,2-propanediol, 1,3-propanediol, 2,2-dimethyl-1,3-propanediol, 1,4- butanediol, 1,5-pentanediol, 1,6-hexanediol, 2-methyl-1,5-pentanediol, 2,2,4-trimethyl 1,6-hexanediol, 2,4,4-trimethyl-1,6-hexanediol, 1,7-heptanediol, 1,10-decanediol, 1,12-dodecanediol, 9,10-octadecene-1,12-diol, octadecane-1,18-diol, 2,4-dimethyl-2-propyl-1,3-heptanediol, 1,4-butenediol, 1,4-butynediol, diethylene glycol, triethylene glycol, tetraethylene glycol, trans- and cis-1,4-cyclohexanedimethanol, the triols glycerol, 1,2,6-hexanetriol, 1,1,1-trimethylolpropane and 1,1,1-trimethylolethane and the tetraol pentaerythritol. Mixtures of polyols may be used.

B2. The crystalline urethane acrylate of the present invention is preferably prepared using a polyisocyanate that is a diisocyanate of aliphatic, (cyclo)aliphatic or cycloaliphatic structure. Representative examples of the polyisocyanates are 2-methylpentamethylene 1,5-diisocyanate, hexamethylene diisocyanate, trimethylhexamethylene 1,6-diisocyanate, especially the 2,2,4- and the 2,4,4-isomers and technical grade mixtures of the two isomers, 4,4'-methylene-bis (cyclohexyl isocyanate), norbornane diisocyanate and 3,3,5-trimethyl-1-isocyanato-3-isocyanatomethylcyclohexane (IPDI). It is equally possible to use polyisocyanates obtained by reaction of a polyisocyanate with itself via isocyanate groups, such as isocyanurates which is formed by reaction of three isocyanate groups. The polyisocyanates may likewise contain a biuret or an allophanate group. IPDI is particularly preferred.

B3. The polymerizable compound is identical to component A3.

The urethane acrylate B of the invention is prepared from the crystalline OH-containing polyester (B1), polyisocyanates (B2) and (B3) by first initially charging the polyisocyanate, adding DBTL catalyst and IONOL CP (Shell) polymerization inhibitor and the polyester in an NCO:OH ratio of 2.5–1.5:1. The NCO:OH ratio includes all values and subvalues therebetween, especially including 2.3:1, 2.1:1, 1.9:1 and 1.7:1. After the addition has ended, the reaction is completed at 70–30° C. The temperature of completion includes all values and subvalues therebetween, especially including 65, 60, 55, 50, 45, 40 and 35° C. The reaction product is then admixed with the B3 component, for example hydroxyethyl acrylate, in a residual NCO:OH ratio of 1.0–1.1:1 and the reaction completed at 70–130° C., so that an NCO content below 0.1%, preferably below 0.05, more preferably below 0.01 and most preferably below 0.005% is obtained.

Amorphous and crystalline urethane acrylates are mixed in an amorphous to crystalline ratio of from 60:40 to 90:10% by weight so that the end product has a Tg of at least 35° C. The amorphous to crystalline ratio includes all values and subvalues therebetween, especially including 65:35, 70:30, 75:25, 80:20 and 85:15% by weight. Tg is preferably at least 40, more preferably at lest 50 and most preferably at least 60° C. It is also possible to mix the amorphous and crystalline starting polyesters and then to react this mixture with polyisocyanates and acrylate-containing alcohols.

A further material is an UV initiator which is known in principle from conventional liquid UV curing systems, as described, for example in EP 633912. This is a material which upon irradiation with UV light decomposes into free radicals and so initiates the polymerization. Preferred UV initiators include, for example, 2,2'-diethoxyacetophenone, hydroxycyclohexyl phenyl ketone, benzophenone, 2-hydroxy-2-methyl-1-phenylpropan-1-one, xanthone, thioxanthone, benzil dimethyl ketal, etc. Such UV initiators are commercially available, for example IRGACURE 184 or DEGACURE 1173 from Ciba. The fraction of the overall system attributable to the photoinitiator is about 0.5 to 5% by weight. The fraction of photoinitiator includes all values and subvalues therebetween, especially including 1, 1.5, 2, 2.5, 3, 3.5, 4 and 4.5% by weight.

Optional additives include acrylate- or methacrylate-containing compounds, for example, the triacrylate of tris (2-hydroxyethyl) isocyanurate (SR 386; Sartomer), and adhesion promoters, which may be used in minor fractions of 0–20% by weight to modify the coating properties. The amount of additive includes all values and subvalues therebetween, especially including 2, 4, 6, 8, 10, 12, 14, 16, and 18% by weight.

Further additives customary in the case of powder coatings are flow agents, light stabilizers and degassing agents. These can be used in 0–5% by weight. The amount includes all values and subvalues therebetween, especially including 0.5, 1, 1.5, 2, 2.5, 3, 3.5, 4 and 4.5% by weight. The use of pigments and fillers is also possible. For example, metal oxides such as titanium dioxide, and metal hydroxides, sulfates, sulfides, carbonates, silicates, talc, carbon black, etc. in weight fractions of 0–30% may be used. The amount of additive includes all values and subvalues therebetween, especially including 5, 10, 15, 20 and 25% by weight.

The ready-to-use powder coating composition is prepared by mixing the starting materials. The starting materials can be homogenized in suitable assemblies, for example, heatable kneaders. Preferably, the starting materials are homogenized by extrusion, in which case upper limits of the temperature of 120–130° C. should not be exceeded. The temperature includes all values and subvalues therebetween, especially including 122, 124, 126 and 128° C. The extruded material is cooled to room temperature and suitably comminuted before it is ground to the ready-to-spray powder without addition of cryogens. The ready-to-spray powder can be applied to appropriate substrates by the known techniques, for example, by electrostatic or tribostatic powder spraying or fluidized bed sintering with or without electrostatic assistance.

The invention further provides a polymer containing a urethane group and a terminal acrylate group and comprising A) 60–90% by weight of at least one amorphous urethane acrylate, and B) 10–40% by weight of at least one crystalline urethane acrylate, subject to the proviso that the Tg of the mixture of A and B is at least 35° C.;

wherein said amorphous urethane acrylate A is formed by reaction of the following components:

A1) at least one amorphous hydroxyl-containing polyester having a Tg of 35 to 80° C., A2) at least one polyisocyanate, and A3) at least one compound having at least one alcohol group and at least one polymerizable acrylate group, and wherein said crystalline urethane acrylate B is formed by reaction of the following components:

B1) at least one crystalline hydroxyl-containing polyester,

B2) at least one polyisocyanate, and

B3) at least one compound having at least one alcohol group and at least one polymerizable acrylate group.

The amount of the amorphous urethane acrylate A includes all values and subvalues therebetween, especially including 65, 70, 75, 80 and 85% by weight. The amount of the crystalline urethane acrylate B includes all values and subvalues therebetween, especially including 15, 20, 25, 30 and 35% by weight. The Tg of the mixture of A and B is at least 35° C., preferably at least 45° C., more preferably at least 55° C. and most preferably at least 65° C. The Tg of the amorphous hydroxyl-containing polyester A1 includes all values and subvalues therebetween, especially including 40, 45, 50, 55, 60, 65, 70 and 75° C.

The invention also provides for the use of such polymer in a UV curable powder coating composition. A customary auxiliary or additive may be added.

Further, the invention provides for the use of the powder coating compositions of the present invention for the production of coatings with high or low transparency and opaque coatings. A method of producing a coating by coating a substrate with the powder coating composition according to the present invention is also provided. Such coating may be opaque or transparent and have a gloss.

Having generally described this invention, a further understanding can be obtained by reference to certain specific examples which are provided herein for purposes of illustration only, and are not intended to be limiting unless otherwise specified.

EXAMPLES

1. General Method for Preparing Hydroxyl-containing Polyesters

Acid components and alcohol components were admixed with 0.2 mass percent of n-butyltin trioctanoate and heated to 190° C. under nitrogen in an apparatus with a distillation column under stirring. The temperature was gradually raised to 230° C. in the course of the removal of water. After about 98% of the theoretical amount of water was distilled off, the product was cooled down and tested for OH number (OHZ in mg of KOH/g) and acid number (SZ in mg of KOH/g).

This method was used to prepare three polyesters:

A1: amorphous polyester from IPA 100%, MEG 20% and NPG 80%, OHZ 42 mg KOH/g, Tg 48° C.;

A2: amorphous polyester from IPA 100%, MEG 20% and DCD 860%, OHZ 40 mg KOH/g, Tg 75° C.; and B: crystalline polyester from DDA 100%, MEG 100%, OHZ 31 mg KOH/g, mp: 81° C.

DDA: dodecanedioic acid, IPA: isophthalic acid, MEG: monoethylene glycol, NPG: neopentylglycol, DCD: dicidol

2. Preparation of the Amorphous Urethane Acrylate A1U 111.2 g of the polyester A1 (OHZ 42) were melted and added a little at a time at 120° C. to a mixture of 23.7 g of IPDI, 0.3 g of IONOL CP and 0.3 g of DBTL under vigorous stirring. After 30 min of reaction, 14.9 g of hydroxyethyl acrylate were added dropwise as well. After a further 30 min of stirring, the NCO content was below 0.1% and the hot reaction mixture was poured from the flask onto a foil. As soon as the reaction mass had solidified and cooled down, it was mechanically comminuted and ground. The Tg of this product was 41° C.

3. Preparation of the Amorphous Urethane Acrylate A2U 37.7 g of the polyester A2 (OHZ 40) were melted and added a little at a time at 140° C. to a mixture of 7.5 g of IPDI, 0.1 g of IONOL CP and 0.1 g of DBTL under vigorous stirring. After 30 min of reaction, 4.7 g of hydroxyethyl acrylate were added dropwise as well. After a further 30 min of stirring, the NCO content was below 0.1% and the hot reaction mixture was poured from the flask onto a foil. As soon as the reaction mass had solidified and cooled down, it was mechanically comminuted and ground. The Tg of this product was 62° C.

4. Preparation of the Crystalline Urethane Acrylate BU 103.8 g of the polyester B (OH number 31) were melted and added a little at a time at 90° C. to a mixture of 16.1 g of IPDI, 0.1 g of IONOL CP and 0.1 g of DBTL under vigorous stirring. After 30 min of reaction, 10.1 g of hydroxyethyl acrylate were added dropwise as well. After a further 30 min of stirring, the NCO content was below 0.1% and the hot reaction mixture was poured from the flask onto a foil. As soon as the reaction mass had solidified and cooled down, it was mechanically comminuted and ground. The melting point of this product was 80° C.

5. Preparation of the Inventive Polymers and Powder Coating Compositions and of the Comparative Examples The three constituents A1U, A2U and BU were mixed in the appropriate weight ratio and 100 parts of this mixture were admixed with 2 parts of the IRGACURE 184 photoinitiator from Ciba, 0.5 part of BYK 361 flow control agent from BYK Chemie, 0.5 part of benzoin degassing agent from Aldrich and 1 part of EBECRYL 170 adhesion promoter from UCB. The comminuted input materials were intimately mulled and subsequently homogenized in an extruder at not more than 130° C. After cooling, the extrudate was broken and pin milled to a particle size <100 pm with cryogens (liquid nitrogen or dry ice) in the case of the Comparative Examples and without in the case of the Example according to the present invention. The thus prepared powder was applied at 60 KV with an electrostatic powder spraying plant to degreased and optionally pretreated iron panels. This was followed by melting under IR irradiation and curing with UV light (mercury medium pressure lamp, 120 W/cm, 5 m/min).

Comparative Example Z utilized the following recipe:

300 g of UVECOAT 2100 (UCB)

86 g of UVECOAT 9010 (UCB)

8 g of IRGACURE 184 (CIBA)

4 g of RESIFLOW PV 5 (Worlee)

2 g of WORLEE Add 900 (Worlee)

The test values are summarized in Table 1:

TABLE 1

| Ex. | A1U | A2U | BU | Total Tg [° C.] | Grindable without c.[1] | HK[2] [sec] | ET[3] [mm] | KS[4] [in · lb] | LS[5] |
|---|---|---|---|---|---|---|---|---|---|
| Inv. 1 | 56 | 24 | 20 | 43 | Yes | 176 | 6.5 | >80 | >7 d |
| Comp. X | | | 100 | −80 | No | 70 | >10 | >80 | <1 d |
| Comp. Y | 80 | | 20 | 32 | No | 135 | 10 | >80 | 1 d |
| Comp. Z | | | | | No | 88 | 6.4 | 50 | |

[1] Grindability without use of cryogens
[2] König hardness (DIN 53 157)
[3] Erichsen indentation (DIN 53 156)
[4] Ball impact direct (DIN EN ISO 6272)
[5] Storage stability at 35° C. (test for blocking resistance of powder)

Only Example 1 according to the present invention was grindable without addition of cryogen and also exhibited excellent hardness, flexibility and storage stability in the coating. All Comparative Examples (X, Y and Z) have disadvantages in at least one of these points.

German patent application 10068617.1, filed Nov. 25, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. An ultraviolet (UV) curable powder coating composition, comprising:
   I. a binder comprising
      A) 60–90% by weight of at least one amorphous urethane acrylate; and
      B) 10–40% by weight of at least one crystalline urethane acryrate;
         provided that a Tg of a mixture of A and B is at least 35° C.,
         the amount of each of A and B being based on a sum of A and B; and
   II. an auxiliary.

2. The UV curable powder coating composition of claim 1, wherein said amorphous urethane acrylate A is formed by reaction of the following components:
   A1) at least one amorphous hydroxyl-containing polyester having a Tg of 35–80° C.;
   A2) at least one polyisocyanate; and
   A3) at least one compound having at least one alcohol group and at least one polymerizable acrylate group.

3. The UV curable powder coaling composition of claim 2, wherein said polyester A1 is polymerized from
   a) at least one monomeric dicarboxylic acid selected from the group consisting of isophthalic acid and hexahydroterephthalic acid; and
   b) at least one monomeric polyol selected from the group consisting of monoethylene glycol, butanediol, hexanediol, neopentylglycol, dicidol, cyclohexanedimethanol, trimethylolpropane and glycerol.

4. The UV curable powder coating composition of claim 2, wherein said polyisocyanate A2 is isophorone diisocyanate, hexamethylene diisocyanate, trimethylhexamethylene diisocyanate, dicyclolexylmethyl diisocyanate, 2,2,6-trimethyl-1,4-diisocynatocyclohexane, norbornane diisocyanate or a mixture thereof.

5. The UV curable powder coating composition of claim 2, wherein said polyisocyanate A2 is an isocyanurate of isophorone diisocyanate, an isocyanurate of hexamethylene diisocyanate, an isocyanurate of trimethylhexamethylene diisocyanate, an isocyanurate of dicyclohexylmethyl diisocyanate, an isocyanurate of 2,2,6-trimethyl-1,4-diisocyanatocyclohexane, an isocyanurate of notbornane diisocyanate, an allophonate of isophorone diisocyanate, allophonate of hexamethylene diisocyanate, allophonate of trimethylhexamethylene diisocyanate, allophonate of dicyclohexylmethyl diisocyanate, allophonate of 2,2,2,6-trimethyl-1,4-diisocyanatocyclohexane, allophonate of norbornane diisocyanate, a biuret of isophorone diisocyanate, a biuret of hexamethylene diisocyanate, a biuret of trimethylhexamethylene diisocyanate, a biuret of dicyclohexylmethyl diisocyanate, a biuret of 2,2,6-trimethyl-1,4-diisocyanatocyclohexane, or a biuret of norbornane diisocyanate.

6. The UV curable powder coating composition of claim 2, wherein said component A3 is hydroxyethyl acrylate.

7. The UV curable powder coating composition of claim 1, wherein said crystalline urethane acrylate B is formed by reaction of the following components:
   B1) at least one crystalline hydroxyl-containing polyester;
   B2) at least one polyisocyanate; and
   B3) at least one compound having at least one alcohol group and at least one polymerizable acrylate group.

8. The UV curable powder coating composition of claim 7, wherein said polyester B1 is polymerized from a) at least one monomeric dicarboxylic acid selected from the group consisting of dodecanoic acid, adipic acid, succinic acid and sebacic acid and b) at least one monomeric polyol selected from the group consisting of monoethylene glycol, butanediol, hexanediol, glycerol and trimethylolpropane.

9. The UV curable powder coating composition of claim 7, wherein said polyisocyanate B2 is isophorone diisocyanate, hexamethylene diisocyanate, trimethylhexamethylene diisocyanate, dicyclohexylmethyl diisocyanate or 2,2,6-trimethyl-1,4-diisocyanatocyclohexane, norbornane diisocyanate or a mixture thereof.

10. The UV curable powder coating composition according to claim 7, wherein said polyisocyanate B2 is an isocyanurate of isophorone diisocyanate, an diisocyanate, an isocyanurate of dicyclohexylmethyl diisocyanate, an isocyanurate of 2,2,6-isocyanurate of hexamethylene diisocyanate, an isocyanurate of trimethylhexamethylene trimethyl-1,4-diisocyanatocyclohexane, an isocyanurate of norbornane diisocyanate, an allophonate of isophorone diisocyanate, allophonate of hexamethylene diisocyanate, allophonate of trimethylhexamethylene diisocyanate, allophonate of dicyclohexylmethyl diisocyanate, allophonate of 2,2,6-trimethyl-1,4-diisocyanatocyclohexane, allophonate of norbornane diisocyanate, or a biuret of isophorone diisocyanate, a biuret of hexamethylene diisocyanate, a biuret of trimethylhexamethylene diisocyanate, a biuret of dicyclohexylmethyl diisocyanate, a biuret of 2,2,6-trimethyl-1,4-diisocyanatocyclohexane, or a biuret of norbornane diisocyanate.

11. The UV curable powder coating composition of claim 7, wherein said component B3 is hydroxyethyl acrylate.

12. The UV curable powder coating composition of claim 1, wherein said auxiliary is selected from the group consisting of a UV initiator, a flow agent, a light stabilizer, a degassing agent, a pigment, a filler, an adhesion promoter and an acrylate and/or methacrylate-containing compound.

13. A polymer composition containing a urethane group and a terminal acrylate group, comprising:
   A) 60–90% by weight of at least one amorphous urethane acrylate; and
   B) 10–40% by weight of at least one crystalline urethane acrylate;
      provided that a Tg of a mixture of A and B is at least 35° C.,
      the amount of each of A and B being based on a sum of A and B; and
      wherein said amorphous urethane acrylate A is formed by reaction of the following components:
         A1) at least one amorphous hydroxyl-containing polyester having a Tg of 35 to 80° C.;
         A2) at least one polyisocyanate;
         A3) at least one compound having at least one alcohol group and at least one polymerizable acrylate group; and
         wherein said crystalline urethane acute B is formed by reaction of the following components;
            B1) at least one crystalline hydroxyl-containing polyester;
            B2) at least one polyisocyanate; and
            B3) at least one compound having at least one alcohol group and at least one polymerizable acrylate group.

14. A UV curable powder coating composition, comprising:
   the polymer of claim 13; and
   an auxiliary.

15. A coating, obtained by curing the powder coating composition according to claim 1; wherein said cured coating is opaque or transparent.

16. A method of producing a coating, comprising:
   coating a substrate with the powder coating composition according to claim 1, to obtain a coated substrate; and
   curing said coated substrate.

17. The method according to claim 16, wherein said cured coating is opaque or transparent.

* * * * *